(12) United States Patent
Jeong et al.

(10) Patent No.: US 9,373,839 B2
(45) Date of Patent: Jun. 21, 2016

(54) NEGATIVE ELECTRODE ACTIVE MATERIAL AND SECONDARY BATTERY INCLUDING THE SAME

(75) Inventors: Changui Jeong, Yongin-si (KR);
Chungyoo Lee, Yongin-si (KR);
Sungwan Moon, Yongin-si (KR);
Jaehyuk Kim, Yongin-si (KR); Yury Matulevich, Yongin-si (KR); Seunguh Kwon, Yongin-si (KR); Yohan Park, Yongin-si (KR); Jongseo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 931 days.

(21) Appl. No.: 13/363,206

(22) Filed: Jan. 31, 2012

(65) Prior Publication Data
US 2013/0149594 A1 Jun. 13, 2013

Related U.S. Application Data

(60) Provisional application No. 61/570,096, filed on Dec. 13, 2011.

(51) Int. Cl.
| | |
|---|---|
| *H01M 4/134* | (2010.01) |
| *H01M 4/38* | (2006.01) |
| *C22C 28/00* | (2006.01) |
| *C22C 30/00* | (2006.01) |

(Continued)

(52) U.S. Cl.
CPC ............... *H01M 4/386* (2013.01); *C22C 28/00* (2013.01); *C22C 30/00* (2013.01); *H01M 4/134* (2013.01); *H01M 4/1395* (2013.01); *H01M 10/0525* (2013.01); *Y10T 29/49108* (2015.01)

(58) Field of Classification Search
None
See application file for complete search history.

(56) References Cited

U.S. PATENT DOCUMENTS

| 6,730,434 B1 | 5/2004 | Kawakami et al. |
| 2006/0046144 A1 | 3/2006 | Obrovac |

(Continued)

FOREIGN PATENT DOCUMENTS

| CN | 1747201 A | 3/2006 |
| EP | 2 375 476 A2 | 10/2011 |

(Continued)

OTHER PUBLICATIONS

EPO Search Report dated Apr. 18, 2013, for corresponding European Patent application 12162303.7, (6 pages).

(Continued)

*Primary Examiner* — Cynthia K Walls
(74) *Attorney, Agent, or Firm* — Lewis Roca Rothgerber Christie LLP

(57) ABSTRACT

A negative electrode active material and a secondary battery including the same are provided. More particularly, the present disclosure relates to a negative electrode active material including a Si-metal alloy including Si, the Si being present in the Si-metal alloy in an amount of 66 at % or less, and at least a portion of the Si being crystalline Si. The negative active material can provide a high-capacity battery, which can retain high capacity due to little volumetric expansion during charging and discharging, thereby demonstrating an excellent life characteristic of the secondary battery. The negative electrode active material may include a Si-metal alloy including crystalline Si having a crystal grain size of 30 nm or less. Methods of preparing a negative electrode active material and methods of preparing a secondary battery including the same are also disclosed.

16 Claims, 10 Drawing Sheets

(51) Int. Cl.
*H01M 4/1395* (2010.01)
*H01M 10/0525* (2010.01)

(56) References Cited

U.S. PATENT DOCUMENTS

| | | | |
|---|---|---|---|
| 2008/0113271 A1 | 5/2008 | Ueda et al. | |
| 2008/0145759 A1 | 6/2008 | Sung et al. | |
| 2008/0233480 A1 | 9/2008 | Sung et al. | |
| 2010/0288982 A1* | 11/2010 | Le et al. | 252/513 |
| 2012/0037858 A1* | 2/2012 | Kim et al. | 252/519.12 |
| 2012/0264015 A1* | 10/2012 | Jung et al. | 429/211 |
| 2013/0122368 A1 | 5/2013 | Shinya et al. | |

FOREIGN PATENT DOCUMENTS

| | | | | |
|---|---|---|---|---|
| JP | 2004-311429 | | 11/2004 | |
| JP | 2004-362895 | | 12/2004 | |
| JP | 2008-135364 | | 6/2008 | |
| JP | 2008-235276 | | 10/2008 | |
| JP | 4739462 B1 | | 8/2011 | |
| JP | 2013-105655 | | 5/2013 | |
| KR | 10-2007-0098924 A | | 10/2007 | |
| KR | 10-2010-0078440 A | | 7/2010 | |
| KR | 10-2010-0080479 A | | 7/2010 | |
| WO | WO 00/17949 A1 | | 3/2000 | |
| WO | WO 2010/077100 | * | 7/2010 | H01M 10/052 |
| WO | WO 2010/132279 A1 | | 11/2010 | |
| WO | WO 2011/155770 | * | 12/2011 | H01M 10/052 |

OTHER PUBLICATIONS

EPO Office action dated Jan. 4, 2016, for corresponding European Patent application 12162303.7, (6 pages).
SIPO Office action dated Jan. 21, 2016, for corresponding Chinese Patent application 201210245674.9, (7 pages).
JPO Office action dated Mar. 15, 2016, for corresponding Japanese Patent application 2012-126305, (6 pages).
Sun, Z.B., et al., *Electrochemical properties of melt-spun Al—Mn alloy anodes for lithium-ion batteries*, Journal of Power Sources, vol. 182, No. 1, Jul. 15, 2008, pp. 353-358, XP 22704015.
English Abstract and English machine translation of Japanese Patent 4739462, dated Aug. 3, 2011, listed above, (23 pages).
English Abstract and English machine translation of Japanese Publication 2004-311429, dated Nov. 4, 2004, listed above, (71 pages).
English Abstract and English machine translation of Japanese Publication 2004-362895, dated Dec. 24, 2004, listed above, (24 pages).

* cited by examiner

NEGATIVE ELECTRODE ACTIVE MATERIAL AND SECONDARY BATTERY INCLUDING THE SAME

CROSS-REFERENCE TO RELATED APPLICATION

This application claims priority to and the benefit of U.S. Provisional Application No. 61/570,096, filed on Dec. 13, 2011, in the USPTO, the disclosure of which is incorporated herein in its entirety by reference.

BACKGROUND

1. Field

Embodiments of the present invention relate to a negative electrode active material and a secondary battery including the same.

2. Description of Related Art

The lithium ion secondary battery was developed and used in the early 1990s. Initially, starting from amorphous hard carbon, a carbonaceous material such as graphite is mainly used as a negative electrode active material, which has led to currently developed high-density graphite having a capacity of 360 mAh/g or higher by weight.

However, according to the recent development of a variety of information technology (IT) devices, development of high capacity secondary batteries has become an important issue and the capacity limits of graphite have been reached. Currently used graphite has a theoretical limit capacity of 360 mAh/g. Thus, in order to overcome the problems associated with graphite, there is an urgent need for development of new negative electrode active materials that have higher capacity than currently used graphite.

SUMMARY

An aspect of an embodiment of the present invention is directed toward a negative electrode active material including a Si-metal alloy, which can retain a high capacity due to little volumetric expansion during charging and discharging while providing a high-capacity battery, thereby demonstrating an excellent cycle life characteristic of the battery.

According to an embodiment of the present invention, there is provided a negative electrode active material for a secondary battery including: a Si-metal alloy including Si, the Si being present in an amount of 66 at % or less, and at least a portion of the Si being crystalline Si.

The crystalline Si may have a crystal grain size of 30 nm or less.

In certain embodiments, the Si is present in the Si-metal alloy in an amount in a range of 66 at % to 60 at %.

In other embodiments, the Si is present in the Si-metal alloy in an amount in a range of 65 at % to 62 at %.

The Si-metal alloy may further include one or more metals selected from the group consisting of Ca, Sc, Ti, V, Cr, Mn, Fe, Co, Ni, Cu, Zn, Sr, Y, Zr, Nb, Ba, Lu, Hf, Ta, and lanthanoids.

The Si-metal alloy may include Si-metal alloy particles having an average diameter ($D_{50}$) in a range of 3 to 10 μm.

The Si-metal alloy may further include a first metal and a second metal differing from the first metal.

In certain embodiments, the Si-metal alloy includes SiTiNi, SiFeAl, SiMnAl, SiFeTi, SiFeMn, or SiAlNi.

The first metal and the second metal may each be independently present in an amount in a range of 10 to 20 at %.

In certain embodiments, the crystalline Si has spherically shaped grains.

According to another embodiment of the present invention, there is provided a secondary battery including: a case; and an electrode assembly housed in the case and including a positive electrode, a negative electrode, a separator between the negative electrode and the positive electrode, and a nonaqueous electrolyte, wherein the negative electrode includes a negative electrode active material including a Si-metal alloy including Si, the Si being present in the Si-metal alloy in an amount of 66 at % or less, and at least a portion of the Si being crystalline Si.

The crystalline Si may have a crystal grain size of 30 nm or less.

In certain embodiments, the Si is present in the Si-metal alloy in an amount in a range of 66 at % to 60 at %.

The Si-metal alloy may further include one or more metals selected from the group consisting of Ca, Sc, Ti, V, Cr, Mn, Fe, Co, Ni, Cu, Zn, Sr, Y, Zr, Nb, Ba, Lu, Hf, Ta, and lanthanoids.

The Si-metal alloy may include Si-metal alloy particles having an average diameter ($D_{50}$) in a range of 3 to 10 μm.

The Si-metal alloy may further include a first metal and a second metal differing from the first metal.

In certain embodiments, the Si-metal alloy includes SiTiNi, SiFeAl, SiMnAl, SiFeTi, SiFeMn, or SiAlNi.

The first metal and the second metal may each be independently present in an amount in a range of 10 to 20 at %.

According to still another aspect of the present invention, there is provided a method of preparing a secondary battery, the method including preparing a positive electrode; preparing a negative electrode; and accommodating the positive electrode and the negative electrode with a nonaqueous electrolyte in a battery case, wherein the preparing of the negative electrode includes preparing a Si-metal alloy to include Si, the Si being present in the Si-metal alloy in an amount of 66 at % or less, and at least a portion of the Si being crystalline Si.

The preparing of the negative electrode may further include preparing the Si-metal alloy to include the Si and one or more metals selected from the group consisting of Ca, Sc, Ti, V, Cr, Mn, Fe, Co, Ni, Cu, Zn, Sr, Y, Zr, Nb, Ba, Lu, Hf, Ta and lanthanoids by mechanical alloying to form the crystalline Si in the Si-metal alloy, the crystalline Si having a Si crystal grain size of 30 nm or less.

The secondary battery including a negative electrode active material including a Si-metal alloy according to embodiments of the present invention has an excellent capacity retention ratio without a sharp reduction in the capacity even after repeated charging and discharging cycles.

In the Si-metal alloy according to embodiments of the present invention, a crystal grain size of the crystalline Si included in the Si-metal alloy can be controlled by simply adjusting the amount of Si contained in the Si-metal alloy, and a life characteristic of the secondary battery can be greatly improved by controlling the crystal grain size of the crystalline Si.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
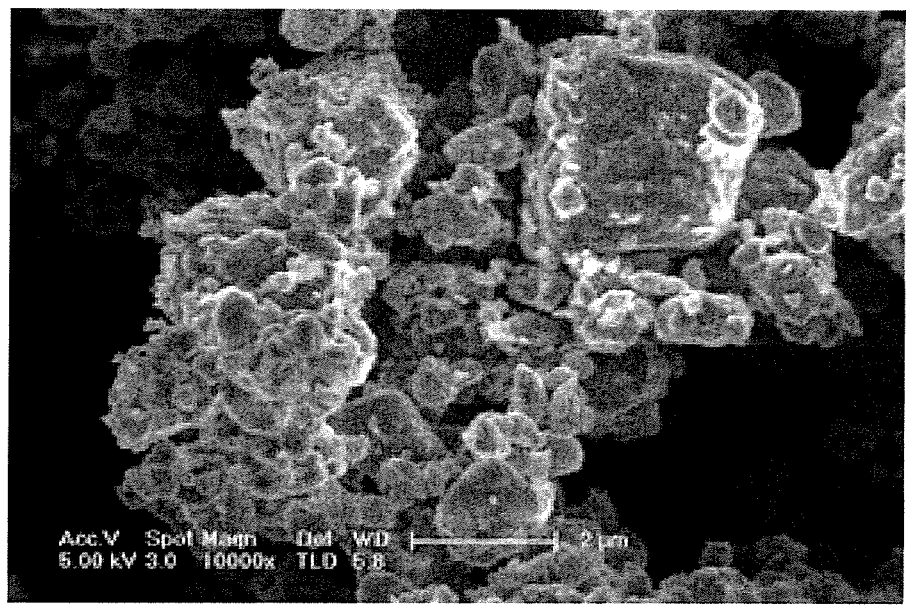
FIG. 1 is an FE-SEM (Field Emission Scanning Electron Microscope) image of the Si-metal alloy prepared according to Preparation Example 1 of the present invention.

Exemplary embodiments will now be described more fully hereinafter with reference to the accompanying drawings. In the following detailed description, only certain embodiments of the present invention are shown and described, by way of illustration. As those skilled in the art would recognize, the invention may be embodied in many different forms and should not be construed as being limited to the embodiments set forth herein.

Embodiments of the present invention provide an improved negative electrode for a nonaqueous electrolyte secondary battery, which has a high capacity and excellent charging/discharging cycle characteristics.

In general, a negative electrode can provide a battery having excellent cycle life and safety and be capable of reversibly intercalating and deintercalating lithium ions even if the capacity is low. A carbonaceous material has been used in the negative electrode, and a lithium ion battery including a negative electrode using a graphite-based carbonaceous material has been previously put into practice.

However, since a graphite material has a relatively low capacity, a metallic material has been used in the negative electrode in place of graphite, the metallic material being capable of achieving a higher capacity than the graphite material. Among other materials, Si demonstrates a high theoretical capacity of 4200 mAh/g. However, when Si is used alone, a sharp reduction in the capacity is eventually demonstrated due to volumetric expansion of the Si during charging and discharging. The volumetric expansion may occur until approximately 400% expansion is reached. Cracks may be created in the active material particles due to excessive expansion and new particle surfaces may be formed due to broken cracks, thereby newly forming a solid electrolyte interface (SEI) film on the surface of the negative electrode. Here, since the cracks of particles are created in an irregular manner, isolated broken particles cannot participate in electrochemical reactions, resulting in a loss of battery capacity.

To solve the problems associated with Si negative electrode active materials, embodiments of the present invention provide a negative electrode active material including a Si-metal alloy.

According to one embodiment of the present invention, the negative electrode active material includes a Si-metal alloy including Si, the Si being present in the Si-metal alloy in an amount of 66 at % or less, and at least a portion of the Si being crystalline. The crystalline Si included in the Si-metal alloy may have a crystal grain size of 30 nm or less. Since the crystal grain size of 30 nm or less will do, a lower limit of the crystal grain size of the crystalline Si is not particularly meaningful.

As used herein, the phrase "crystal grain size" refers to an average crystal grain size. For example, as used herein, the phrase "crystal grain size" may refer to crystal grains having a $D_{50}$ average crystal grain size.

According to embodiments of the present invention, since crystalline Si having a crystal grain size not greater than a set or predetermined level exists between alloy metal atoms of the Si-metal alloy, a high capacity can be imparted to the secondary battery. For example, since the crystal grain size of crystalline Si is limited even during the expansion and shrinkage that results from charging and discharging, a network frame of the alloy metal of the Si-metal alloy can be maintained without being broken, thereby maintaining or retaining the capacity of the secondary battery even after repeated charging and discharging cycles.

According to embodiments of the present invention, the Si-metal alloy powder particles preferably have an average diameter ($D_{50}$) of 3 to 10 μm. In one embodiment, if the average diameter ($D_{50}$) of the Si-metal alloy powder particles is out of the range stated above, the life and initial efficiency characteristics of the manufactured secondary battery are degraded or reduced.

In one embodiment, an amount of Si contained in the Si-metal alloy is 66 at % or less. In certain embodiments, the Si is present in the Si-metal alloy in an amount in a range of 66 at % to 60 at %. For example, the Si may be present in the Si-metal alloy in an amount in a range of 65 at % to 62 at %.

The Si-metal alloy may further include one or more metals selected from the group consisting of Ca, Sc, Ti, V, Cr, Mn, Fe, Co, Ni, Cu, Zn, Sr, Y, Zr, Nb, Ba, Lu, Hf, Ta and lanthanoids, for example Co, Cu, Zn, Ni, Ti or the like.

The Si-metal alloy may include bimetals other than Si. For example, the Si-metal alloy may include a first metal and a second metal differing from the first metal, and examples thereof may include SiTiNi, SiFeAl, SiMnAl, SiFeTi, SiFeMn, and SiAlNi.

The bimetals other than Si may be contained in the Si-metal alloy such that an amount of one metal (e.g., Ni) ranges from 10 to 20 at % and an amount of the other metal (e.g., Ti) ranges from 10 to 20 at %. For example, the first metal and the second metal each be present independently in an amount in a range of 10 to 20 at %.

According to one embodiment of the present invention, the crystalline Si has spherically shaped crystal grains.

Negative Electrode

In embodiments of the present invention, types of raw materials for preparing a negative electrode active material are not particularly limited as long as the raw materials can implement a composition ratio necessary for the negative electrode active material. For example, in order to mix elements forming the negative electrode active material in a desired composition ratio, elements, alloys, solid solutions, intermetal compounds or the like can be used, but the present invention is not limited thereto.

Preparation of Si-Metal Alloy Powder

The negative electrode active material according to an exemplary embodiment of the present invention was prepared by weighing metal powder to be alloyed, such as Si, Ni, Ti or the like according to the selected composition ratio, mixing the same to prepare a Si-containing alloy using a vacuum induction melting furnace. The vacuum induction melting furnace is an apparatus that can melt metal at high temperature using high-frequency induction. At an initial melting stage, the inside of the vacuum induction melting furnace is brought to a vacuum state, followed by injecting an inert gas such as argon (Ar) into the vacuum induction melting furnace, thereby preventing the prepared alloy from being, or reducing the amount that is, oxidized.

The thus-prepared master alloy may be melted using melt spinner equipment that uses high-frequency induction, and the molten metal may be sprayed onto a wheel rotating at high speed, thereby preparing a ribbon-shaped alloy. Here, since it is useful to melt a tri-metal (e.g., Si, a first metal, and a second metal differing from the first metal), a current applying time or the intensity of high frequency applied can be appropriately adjusted while visually confirming that the alloy is melted. In one embodiment, the high frequency is applied for less than 5 minutes.

According to one embodiment of the present invention, a mixture of the raw materials for the Si-metal alloy may be melted before the alloying, and the melted product may be rapidly cooled and solidified.

In the thus-prepared Si-metal alloy used in embodiments of the present invention, the crystal grain size of the crystalline Si may be observed by TEM photograph. In addition, the crystal grain size can be calculated using a full width at half maximum of a main peak, as analyzed by XRD.

For example, the crystal grain size of the crystalline Si can be calculated by using equations known in the related art. The crystal grain size according to an embodiment of the present invention can be calculated by the following Scherrer Equation.

$$\tau = \frac{K\lambda}{\beta\cos\theta}$$

In the above equation, K is the shape factor, $\lambda$ is the x-ray wavelength, $\beta$ is the full width at half maximum, and $\theta$ is the Bragg angle. As the shape factor, 0.9 is usually used but it may be changed depending on the crystallite of an object crystal grain.

Therefore, according to one embodiment of the present invention, an average crystal grain size of the crystalline Si in the Si-metal alloy can be obtained by using the above Scherrer Equation with the full width at half maximum obtained for the Si (111) surface from the X-ray diffraction spectrum in which CuK-α radiation and X-ray wavelength of 1.541 Å are used.

For example, referring to FIGS. 5 to 9, the average crystal grain sizes of the crystalline Si can be calculated with a full width at half maximum of the peak at 28.5, which is Bragg angle 2θ.

Therefore, in one embodiment, the crystal grain size of the crystalline Si is controlled by adjusting the amount of Si in the Si-metal alloy, thereby preparing the negative electrode active material according to embodiments of the present invention, such as a Si-metal alloy including Si, the Si being present in the Si-metal alloy in an amount of 66 at % or less, and at least a portion of the Si being crystalline Si. In certain embodiments, the crystalline Si has a crystal grain size in a range of 30 nm or less.

In embodiments of the present invention, the Si-metal alloy may be used in the form of powder. The Si-metal alloy powder can be obtained by alloying Si and the other metals to be alloyed and then pulverizing the alloy materials. The pulverizing may be performed by a method generally used in the related art.

For example, an apparatus used for pulverizing may include, but is not limited to, an atomizer, a vacuum mill, a ball mill, a planetary ball mill, a beads mill, a jet mill and so on.

The pulverizing method is largely classified into a dry type and a wet type, and either method can be applied to the present invention.

The thus-prepared Si-metal alloy powder may have an average particle diameter ($D_{50}$) that can be measured by, for example, a micro track method.

Preparation of Negative Electrode

The negative electrode according to the present invention can be prepared by a conventional method generally known in the related art. For example, the negative electrode can be prepared by mixing a binder, a solvent, if necessary, a conductive material, and a dispersant agent with the negative electrode active material according to the present invention, stirring the mixture to give a slurry, coating the slurry on a current collector made of a metallic material, compressing and drying the same.

According to an embodiment of the present invention, the negative electrode active material may be used in an amount in a range of 70 to 98 wt %, the binder may be used in an amount in a range of 1 to 30 wt %, and the conductive material may be used in an amount in a range of 1 to 25 wt %.

Usable or suitable examples of the binder may include any binder materials without limitation as long as they can form an electrode. Specific examples of the binder may include, but are not limited to, polyamide imide (PAI), polyvinylidene fluoride (PVdF), polyethylene, polypropylene, polytetrafluoroethylene (PTFE), and styrene butadiene rubber. In certain embodiments, polyamide imide (PAI) is preferred.

Usable or suitable examples of the conductive material may include, but are not limited to, carbon black, Ketjen black, acetylene black, artificial graphite, carbon fiber, carbon nanotube, amorphous carbon, and so on.

In one embodiment, the binder is dissolved in a solvent such as NMP and homogenized with Si-metal alloy powder, or a conductive material, thereby preparing slurry.

In the current collector, which may be made of a metallic material, any metal, to which the slurry of the negative electrode active material is easily adhered, may be used as the highly conductive metal as long as it shows no reactivity in the voltage range of battery. Representative examples of the current collector may include a mesh or foil formed of aluminum, copper, gold, nickel or combinations thereof, but the present invention is not limited thereto.

The method of coating the slurry on the current collector is not particularly limited. For example, the slurry may be coated on the current collector by doctor blade, dipping, brushing or the like. An amount of the slurry is not particularly limited. However, a thickness of an active material layer formed after removing the solvent or the dispersion medium is generally in a range of 0.005 to 5 mm, for example in a range of 0.01 to 0.1 mm.

The method of removing the solvent or the dispersion medium is not particularly limited. However, the solvent or the dispersion medium may be removed by adjusting the solvent or the dispersion medium to be evaporated as rapidly as possible as long as cracks of the active material layer are not created due to stress concentration, or as long as the active material layer is not separated from the current collector. For example, the solvent or the dispersion medium may be dried in a vacuum oven having an interior temperature in a range of 50 to 200° C. for 0.5 to 3 days.

Positive Electrode

A lithium-containing transition metal oxide may be used as the positive electrode active material for the positive electrode of the secondary battery according to embodiments of the present invention. Specific examples of the positive electrode active material may include one or more materials selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-Y}Mn_yO_2$ (here, $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (here, $0<Z<2$), $LiCoPO_4$, and $LiFePO_4$.

The positive electrode is prepared using the positive electrode active material by methods generally known in the related art. Since contents of the positive electrode are generally known, a description thereof will be omitted.

Secondary Battery

The secondary battery according to embodiments of the present invention, including a negative electrode containing a negative electrode active material according to embodiments of the present invention, may be formed by methods generally known in the related art. For example, the secondary battery may be formed by providing a porous separator between a positive electrode and a negative electrode and injecting an electrolyte solution. The secondary battery may include a lithium ion secondary battery, a lithium polymer secondary battery, a lithium ion polymer secondary battery, and the like.

A secondary battery including a negative electrode according to an embodiment of the present invention will be described below in more detail.

Figure 18:
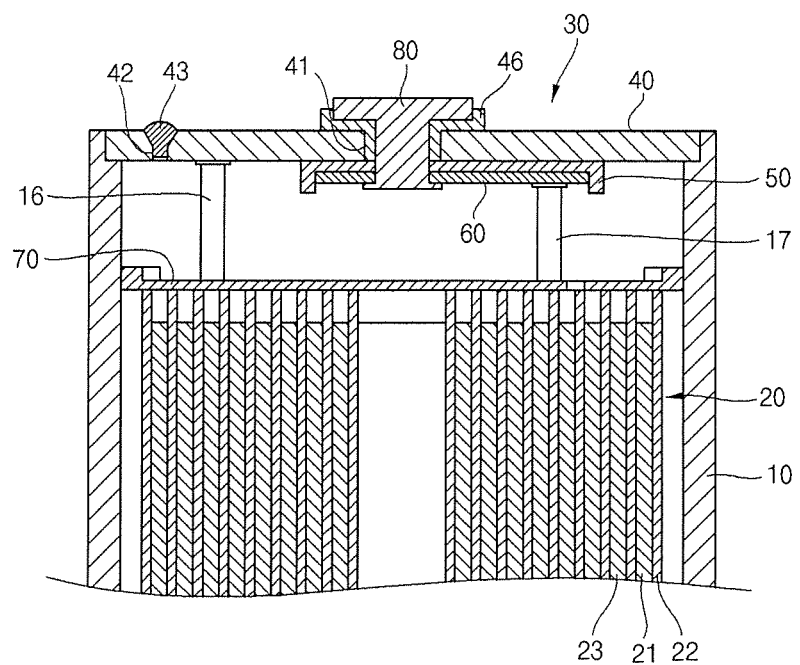
FIG. 18 is a partial cross-sectional view of a lithium secondary battery according to an embodiment of the present invention.

FIG. 18 illustrates a partial cross-sectional view of the lithium secondary battery according to an embodiment of the present invention. While a method of manufacturing a lithium secondary battery as described below is provided for the purpose of understanding, it will be understood by those of ordinary skill in the art that various changes may be made without departing from the spirit and scope of the present invention.

Referring to FIG. 18, a lithium secondary battery according to embodiments of the present invention includes a can 10, an electrode assembly 20, a cap assembly 30, and an electrolyte. In the lithium secondary battery, the electrode assembly 20 and electrolyte are accommodated in the can 10, and the cap assembly 30 is formed by sealing a top part of the can.

The electrode assembly 20 may include a positive electrode plate 21, a negative electrode plate 23, and a separator 22. The electrode assembly 20 may be formed by winding the laminated layers after sequentially laminating the positive electrode plate 21, separator 22, and negative electrode plate 23.

The cap assembly 30 may include a cap plate 40, an insulation plate 50, a terminal plate 60, and an electrode terminal 80. The cap assembly 30 may be assembled with an insulation case 70 to seal the can 10.

The electrode terminal 80 may be inserted into a terminal through-hole 41 formed in the center of the cap plate 40. The electrode terminal 80 may be inserted into the terminal through-hole 41 together with the tube type gasket in a state that a tube type gasket 46 is coupled to the outer face of the electrode terminal 80 when inserting the electrode terminal 80 into the terminal through-hole 41. Therefore, the electrode terminal 80 may be electrically insulated with the cap plate 40.

The electrolyte may be injected into the can 10 through an electrolyte injection hole 42 after the cap assembly 30 is assembled onto the top part of the can 10. The electrolyte injection hole 42 may be sealed by a separate stopper 43. The electrode terminal 30 may be connected to a negative electrode tab 17 of the negative electrode plate 23 or a positive electrode tab 16 of the positive electrode plate 21 such that the electrode terminal 80 is operated as a negative terminal or a positive terminal.

Separator

In one embodiment, the separator is disposed between the positive electrode and the negative electrode, and an insulating thin film having high ionic transmissivity and mechanical strength is used as the separator.

In one embodiment, the separator has a porosity having a diameter ranging from 0.01 to 10 μm and a thickness ranging from 5 to 300 μm. Examples of the separator may include olefin-based polymers having chemical resistance and hydrophobicity, such as polypropylene; a sheet or nonwoven fiber made of polyethylene or glass fiber. When a solid electrolyte such as a polymer is used as the electrolyte, the solid electrolyte may serve as the separator.

In the separator, specific examples of olefin-based polymers may include polyethylene, polypropylene, polyvinylidene fluoride, or a plurality of layers formed of two or more of these materials, or may include composite multilayer separators, such as a polyethylene/polypropylene two-layer separator, a polyethylene/polypropylene/polyethylene three-layer separator, a polypropylene/polyethylene/polypropylene three-layer separator, or the like.

Nonaqueous Electrolyte

The lithium salt containing nonaqueous electrolyte includes a nonaqueous electrolyte and a lithium salt.

A nonaqueous electrolyte solution, a solid electrolyte, or an inorganic solid electrolyte may be used as the nonaqueous electrolyte.

Examples of the nonaqueous electrolyte may include aprotic organic solvents such as N-methyl-2-pyrrolidone, ethylene carbonate, propylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolone, formamide, dimethyl formamide, dioxolone, acetonitrile, nitromethane, methyl formate, methyl acetate, triester phosphate, trimethoxy methane, dioxolone derivative, sulforane, methyl sulforane, 1,3-dimethyl-2-imidazolidinone, propylene carbonate derivative, tetrahydrofuran derivative, ether, methyl propionate, or ethyl propionate.

Examples of the organic solid electrolyte may include polyethylene derivatives, polyethylene oxide derivatives, polypropylene oxide derivatives, phosphoric acid ester polymers, polyagitation lysine, polyester sulfide, polyvinylalcohol, polyfluorovinylidene, polymers containing ionic disintegrators, and the like.

The inorganic solid electrolyte, for example, may include Li-based nitrides (such as $Li_3N$), LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc., halides, sulfates, and the like.

The lithium salt is a material sufficiently soluble in the non-aqueous electrolyte and for example, may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboranlithium, low-grade aliphatic carbonic acid lithium, 4-phenyl-boric acid lithium, imides, and the like. For the purpose of enhancing charge and discharge characteristics, fire-retardancy, etc., for example, pyridine, triethylphosphite, triethanolamine, cyclic ether, ethylene diamine, n-glyme, hexa phosphoric acid tri amide, nitrobenzene derivative, sulfur, quinone imine colorant, N-substituted oxasolidinone, N,N-substituted imidasolidine, ethylene glycol dialkyl ether, ammonium salt, pyrrole, 2-methoxy ethanol, trichloro aluminum, etc. may be added to the non-aqueous electrolyte. As occasion demands, to endow incombustibility, a halogen containing solvent, such as tetrachlorocarbon, trifluoroethylene, etc., may be added to the non-aqueous electrolyte. Further, to improve high-temperature maintenance characteristics, carbon dioxide gas may be further added to the non-aqueous electrolyte.

Hereinafter, the present invention will be described in more detail with reference to the following examples. However, the following examples are only for illustrative purposes and are not intended to be limiting.

Preparation of Si-Metal Alloy

Preparation Example 1

Si:Ti:Ni were mixed in an atomic ratio of 66:17:17 and injected into a vacuum induction melting furnace (commercially available from Yein Tech, Korea), and the inside of the vacuum induction melting furnace was brought to a vacuum state using a vacuum pump, followed by injecting argon (Ar) as an inert gas. As observed by naked eye, an alloy was melted to prepare a master alloy under the condition that a high frequency was induced from a high frequency inducing apparatus with power of 8 kW or less for 5 minutes or less. A ribbon-shaped alloy (having weight ratios of Si 50.57864; Ti 22.20158; Ni 27.21978) containing Si-66 at % was prepared by jetting the master alloy melted by high frequency induction into a rotating wheel.

Figure 2:
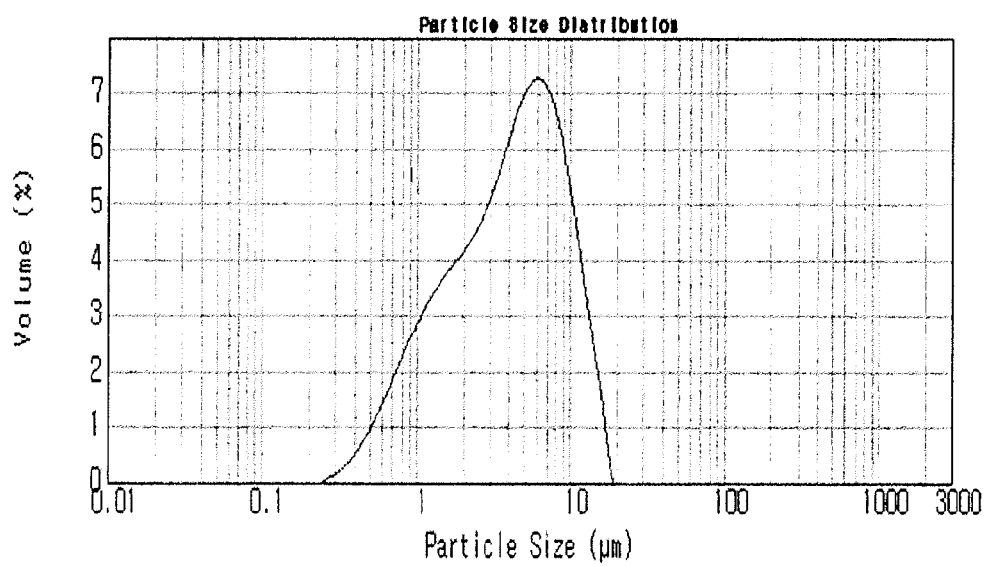
FIG. 2 is a graph illustrating a particle size distribution of the Si-metal alloy powder prepared according to Preparation Example 1 of the present invention.

An FE-SEM image of the Si-alloy powder is illustrated in FIG. 1, and a particle size distribution is illustrated in FIG. 2 ($D_{50}$: 4.155 μm). The particle size distribution of Si—Ti—Ni metal alloy was measured by Laser Diffraction Particle Size Analyzers (LS 13320, Beckman Coulter).

Preparation Example 2

A Si-metal alloy (having weight ratios of Si 49.47232; Ti 22.69858; Ni 27.82911) containing Si-65 at % was prepared in the same manner as in Preparation Example 1, except that Si:Ti:Ni were mixed in a atomic ratio of 65:17.5:17.5.

Preparation Example 3

A Si-metal alloy (having weight ratios of Si-44.15972; Ti-25.08515; Ni-30.75512) containing Si-60 at % was prepared in the same manner as in Preparation Example 1, except that Si:Ti:Ni were mixed in an atomic ratio of 60:20:20.

Comparative Preparation Example 1

Figure 3:
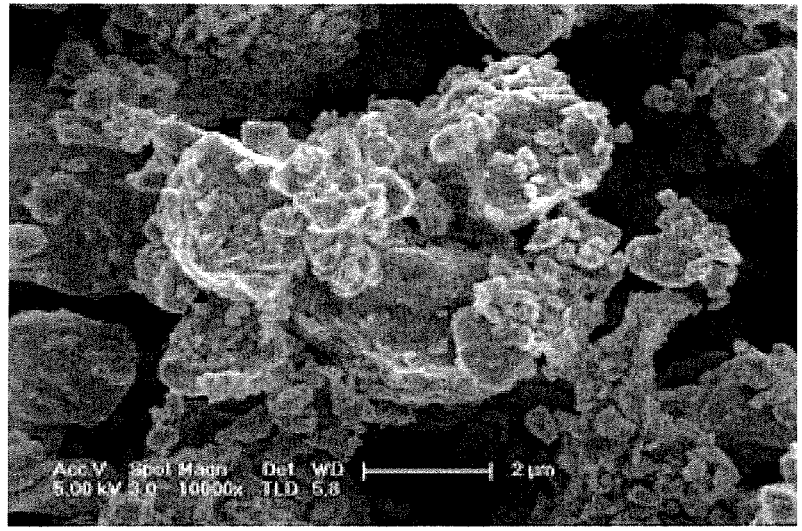
FIG. 3 is an FE-SEM image of the Si-metal alloy powder prepared according to Comparative Preparation Example 1.
Figure 4:
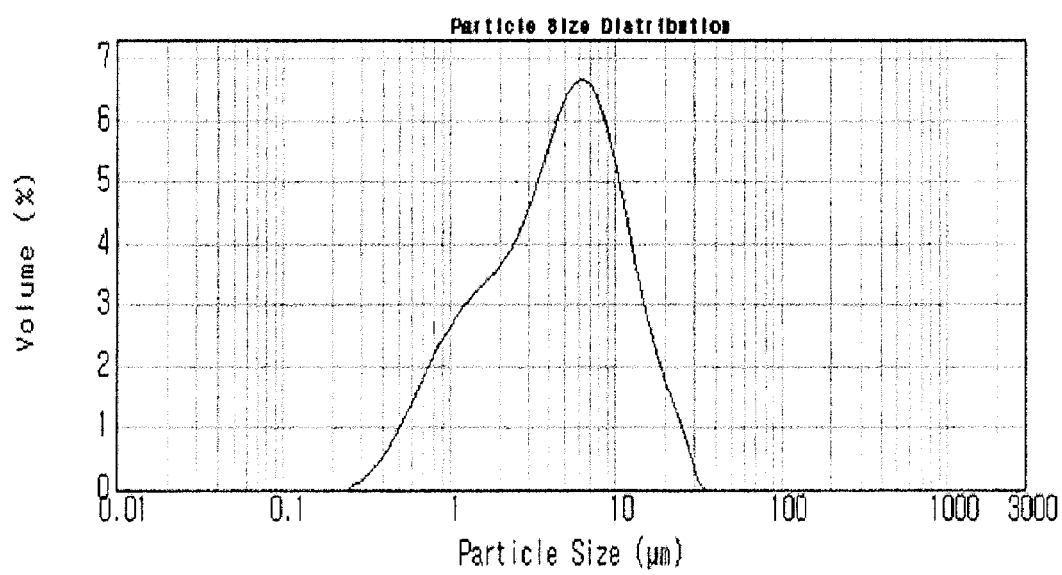
FIG. 4 is a graph illustrating a particle size distribution of the Si-metal alloy powder prepared according to Comparative Preparation Example 1.
Figure 5:
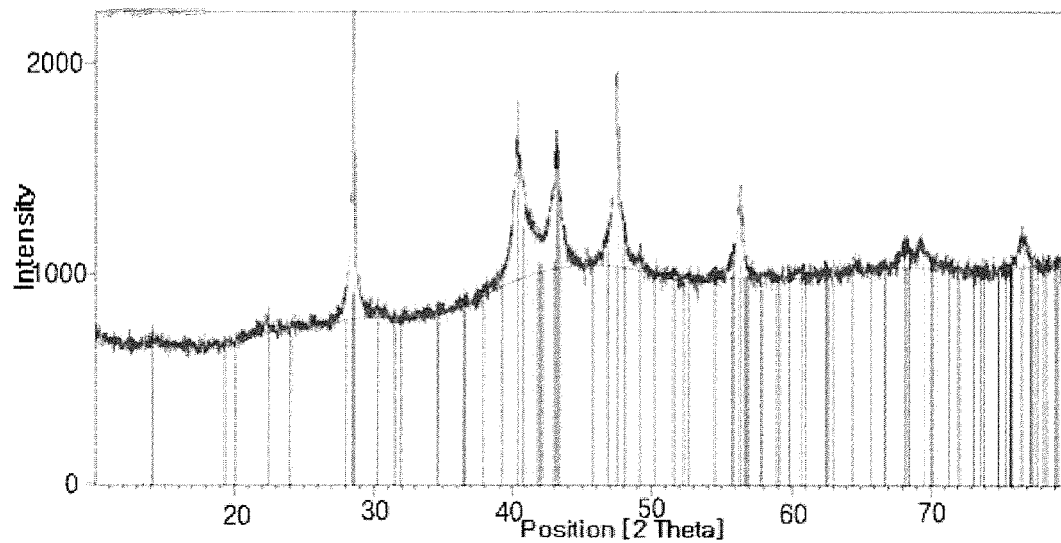
FIGS. 5 to 9 are XRD (X-ray diffraction) graphs of Si-metal alloy powders prepared according to Preparation Examples 1 to 3 of the present invention and Comparative Preparation Examples 1 and 2.
Figure 6:
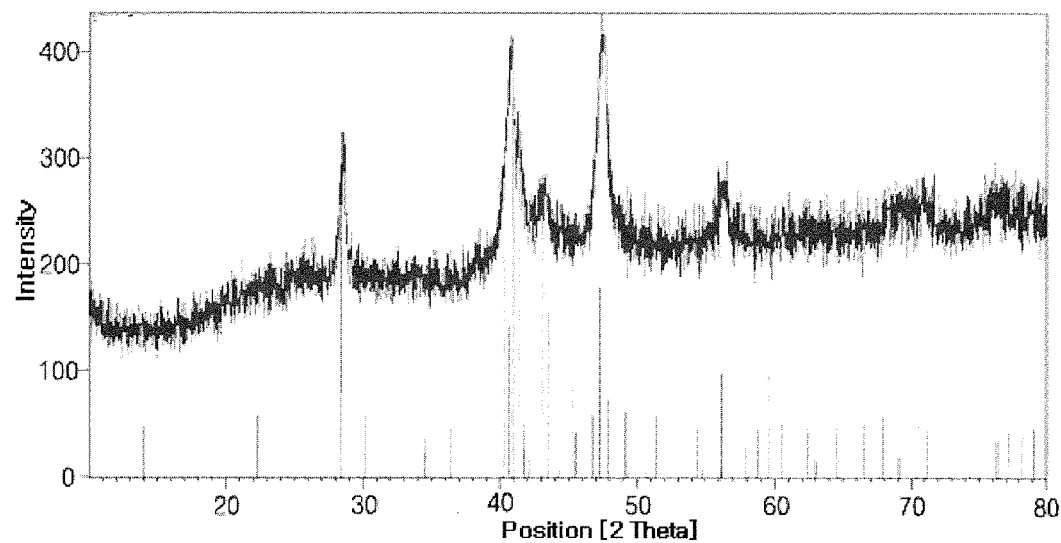
Figure 7:
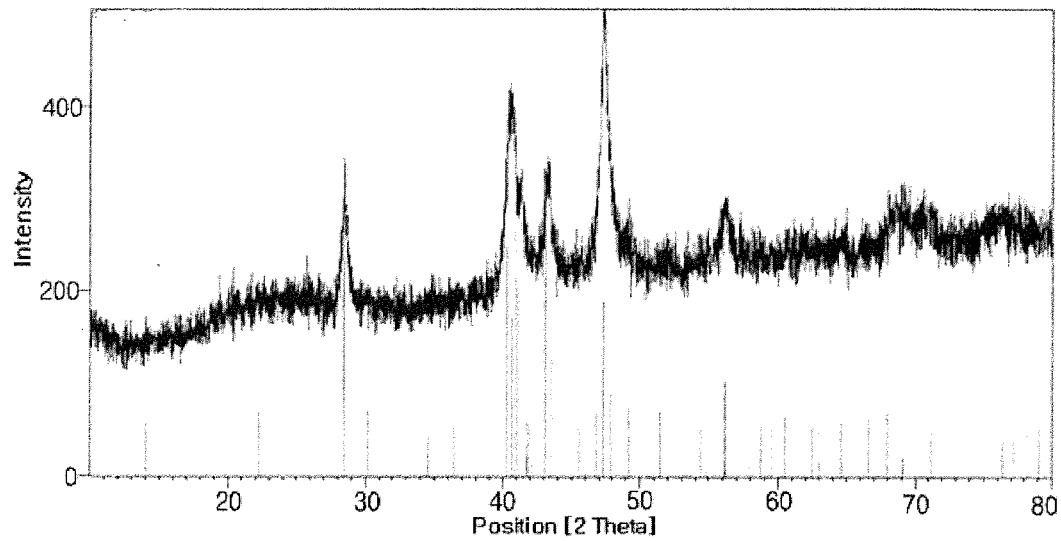
Figure 8:
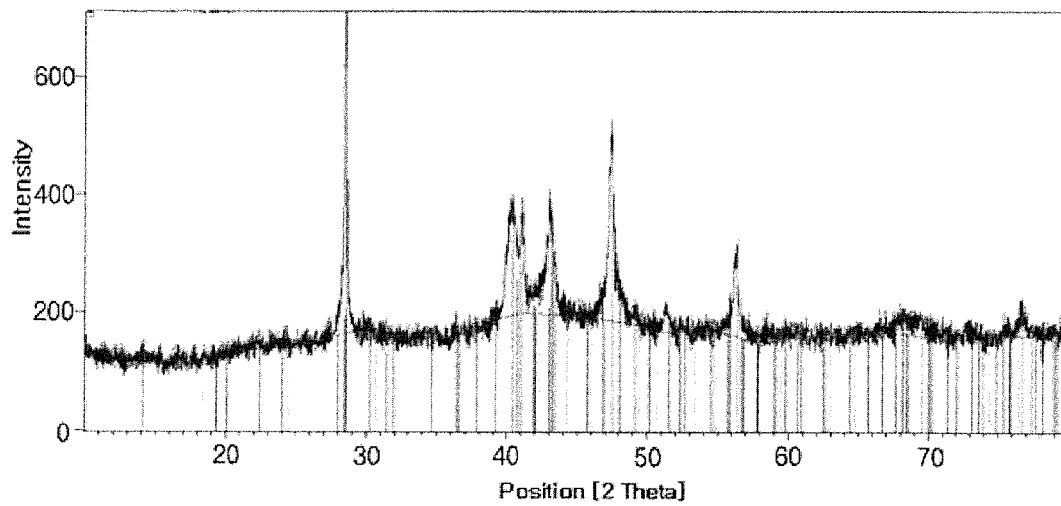
Figure 9:
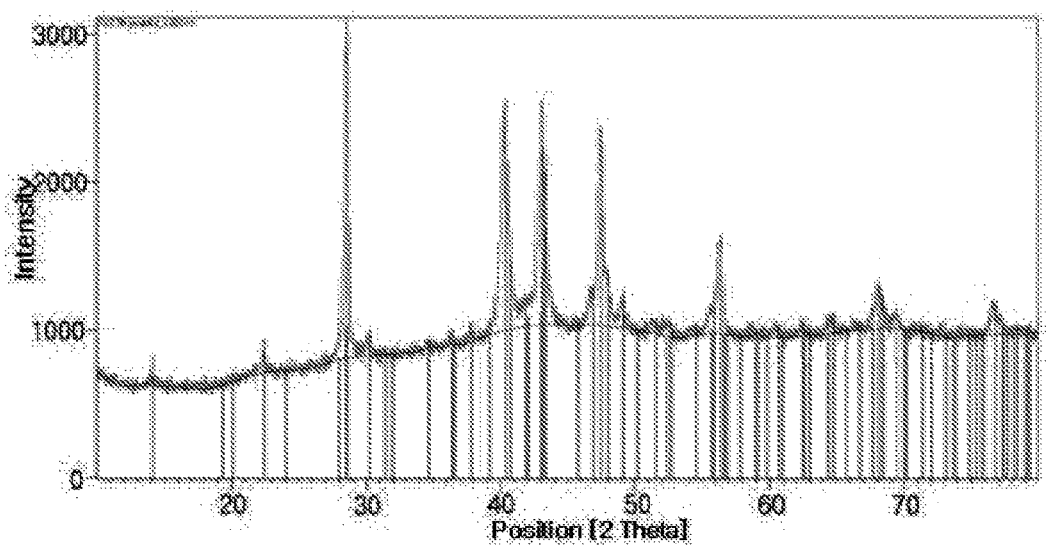

A Si-metal alloy (having weight ratios of Si-52.83756; Ti-21.18681; Ni-25.97564) containing Si-68 at % was prepared in the same manner as in Preparation Example 1, except that Si:Ti:Ni were mixed in an atomic ratio of 68:16:16. An FE-SEM image of the Si-alloy powder is illustrated in FIG. 3, and a particle size distribution is illustrated in FIG. 4 ($D_{50}$: 4.692 μm).

Comparative Preparation Example 2

A Si-metal alloy (having weight ratios of Si-51.70029; Ti-21.6977; Ni-26.60201) containing Si-67 at % was prepared in the same manner as in Preparation Example 1, except that Si:Ti:Ni were mixed in an atomic ratio of 67:16.5:16.5.

In the preparation examples and the comparative preparation examples, the time for ball milling were controlled such that the values of the $D_{50}$ are within 3 to 10 μm.

Preparation of Secondary Batteries

Examples 1-3

The Si-metal alloys prepared in Preparation Examples 1-3 were pulverized using a ball mill to obtain negative electrode active material powder.

The negative electrode active material powder was mixed with polyamideimide (PAI) as a binder, Ketjen Black as a conductive material and N-methylpyrrolidone (NMP) as a solvent to prepare a negative electrode active material slurry.

Here, the negative electrode active material powder, the conductive material and the binder were mixed in a weight ratio of 88:4:8.

The prepared negative electrode slurry was coated on a copper current collector to a thickness of 20 to 60 μm and dried at 110° C. for 15 minutes.

The dried negative electrode plate was annealed in a vacuum atmosphere of 350° C. for one hour.

The resultant electrode plate (it will be used for working electrode) was cut into a size of 16 mm in diameter, a 700 μm lithium metal was used as a reference electrode (control electrode), and 1.5M LiPF6 EC/DEC/FEC mixed in a ratio of 5/70/25 was used as an electrolyte solution to manufacture 2016 size coin cells, respectively.

Comparative Examples 1-2

Secondary batteries were manufactured in the same manner as in Example 1, except that the Si-metal alloys prepared in Comparative Preparation Examples 1 and 2 were used.

Identification of Crystal Grains of Crystalline Si in Si-Metal Alloy

Experimental Example 1

In order to identify crystal grain sizes of the crystalline Si included in Si-metal alloy powder particles prepared in Preparation Examples 1-3 and Comparative Preparation Examples 1-2, XRD analysis was conducted, and the results thereof are shown in FIGS. 5 to 9.

The crystal grain sizes were confirmed by a full width at half maximum of a silicon (Si) peak, as analyzed by XRD.

The crystal grain sizes of the crystalline Si identified by XRD were 30 nm, 22 nm and 18 nm in Preparation Example 1 (66 at %), Preparation Example 2 (65 at %) and Preparation Example 3 (60 at %), respectively, and 47 nm and 38 nm in Comparative Preparation Example 1 (68 at %) and Comparative Preparation Example 2 (67 at %), respectively.

Figure 10:
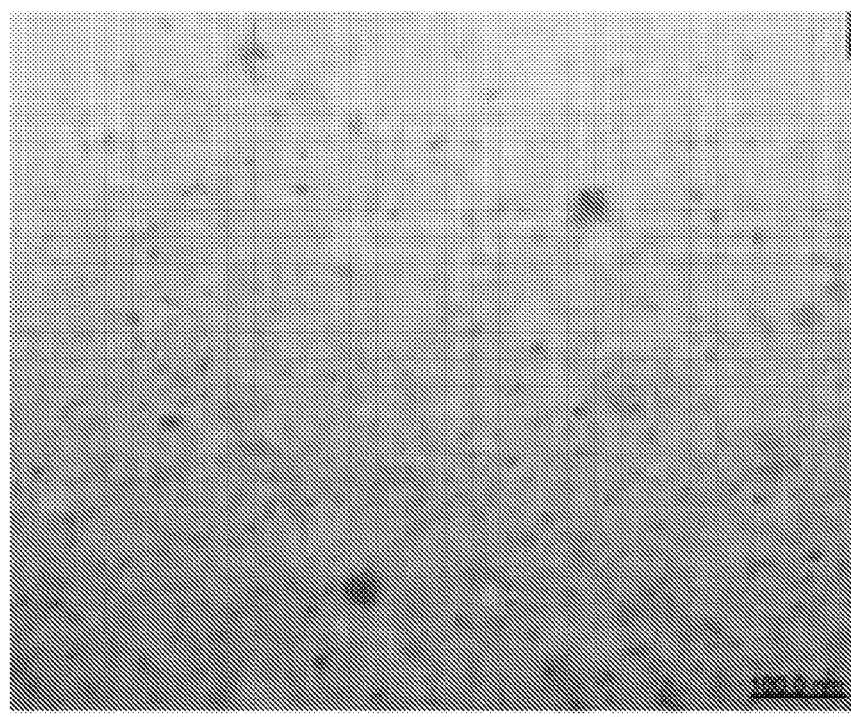
FIGS. 10 and 11 are TEM (Transmission Electron Microscope) photographs of the Si-metal alloy powders prepared according to Preparation Example 1 of the present invention and Comparative Preparation Example 1.
Figure 11:
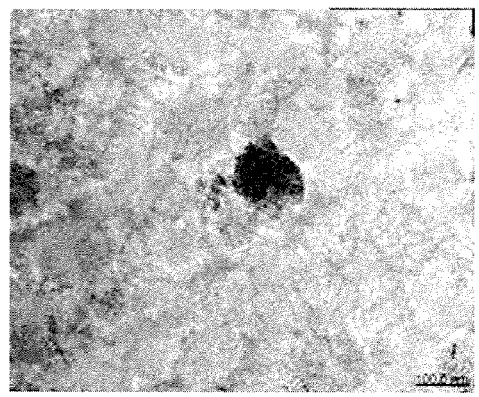

In addition, in order to identify crystal grain sizes of crystalline Si, TEM analysis was conducted. TEM analysis results confirmed that while the crystalline Si having crystal grain size of 50 nm or greater exist in the SiTiNi alloy of Si-68 at %, the crystalline Si having crystal grain size of 30 nm or less exists in the SiTiNi alloy of Si-65 at %, as shown in FIGS. 10 and 11.

Identification of Battery Characteristics

Experimental Example 2

The batteries manufactured in Examples 1-3 and Comparative Examples 1-2 were repeatedly charged/discharged 50 times at a 1.0 C rate. Battery characteristics were evaluated and the evaluation results are shown in FIGS. 12 and 13.

Figure 12:
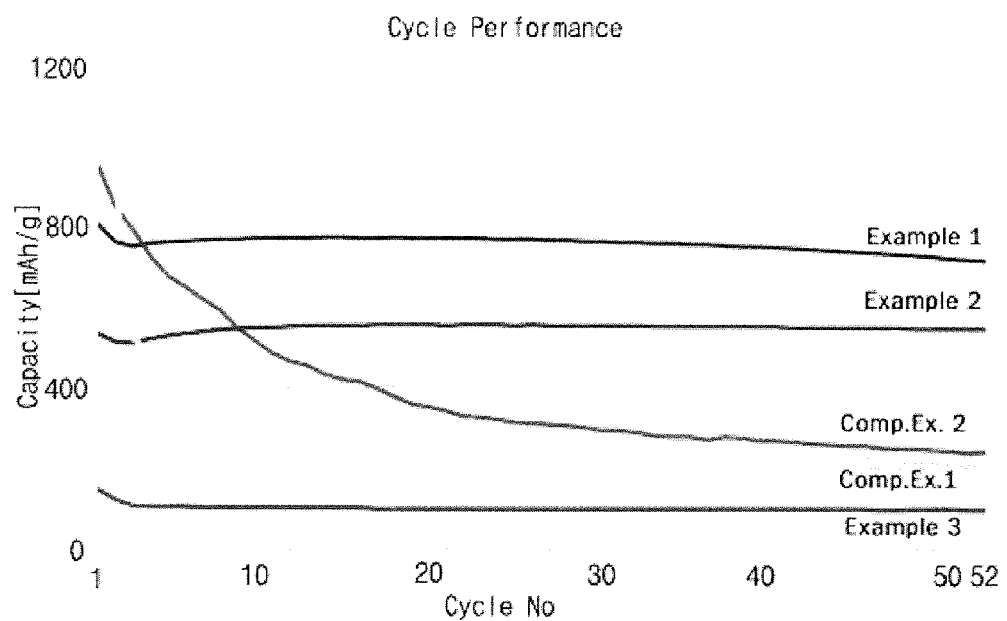
FIGS. 12 and 13 are graphs illustrating capacity retention ratios of batteries prepared in Examples 1 to 3 of the present invention and Comparative Examples 1 and 2.
Figure 13:
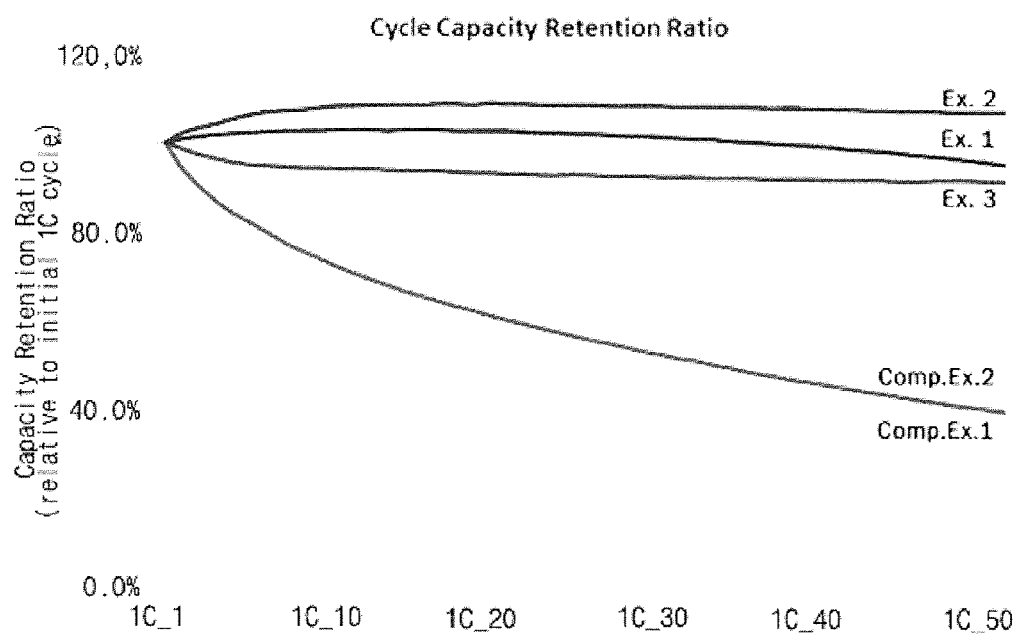

Referring to FIGS. 12 and 13, a discharge capacity of the battery manufactured in Example 1 was approximately 720 mAh/g, a discharge capacity of the battery manufactured in Example 2 was approximately 550 mAh/g, a discharge capacity of the battery manufactured in Comparative Example 1 was approximately 205 mAh/g, and a discharge capacity of the battery manufactured in Comparative Example 2 was approximately 241 mAh/g. After 50 cycles, the cycle retention efficiency of each of the batteries manufactured in Examples 1-3 was 100%, which was much better than that of each of the batteries manufactured in Comparative Example 1 or 2.

Figure 14:
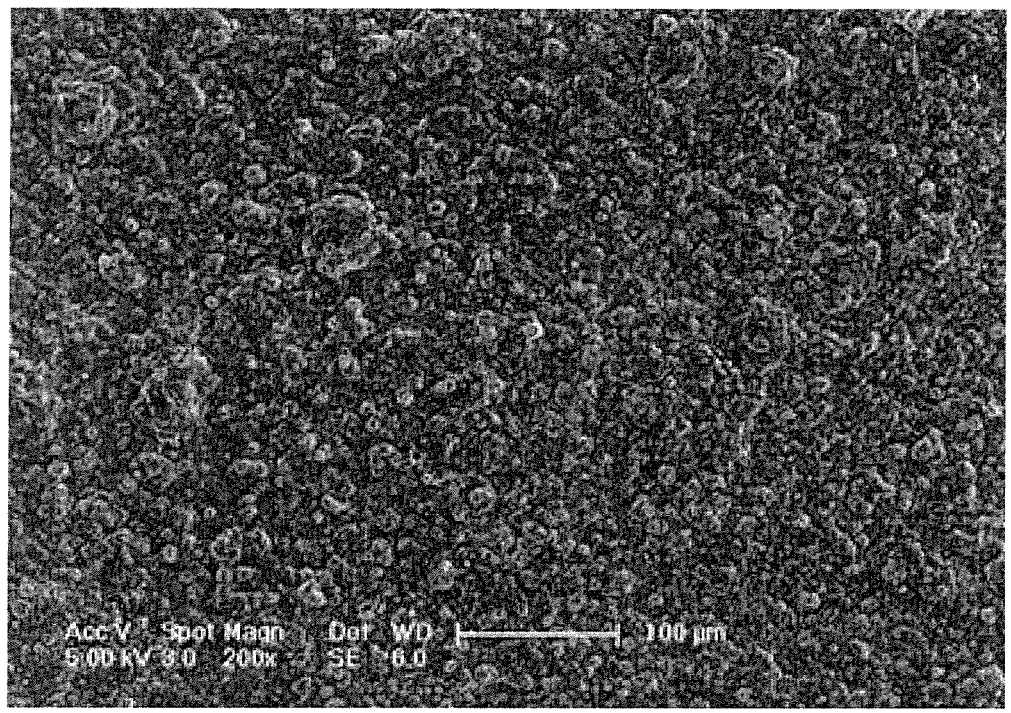
FIGS. 14 to 17 are FE-SEM images of coin cell electrode plates after charging and discharging batteries prepared in Preparation Examples 1 and 3 of the present invention and Comparative Preparation Examples 1 and 2.
Figure 15:
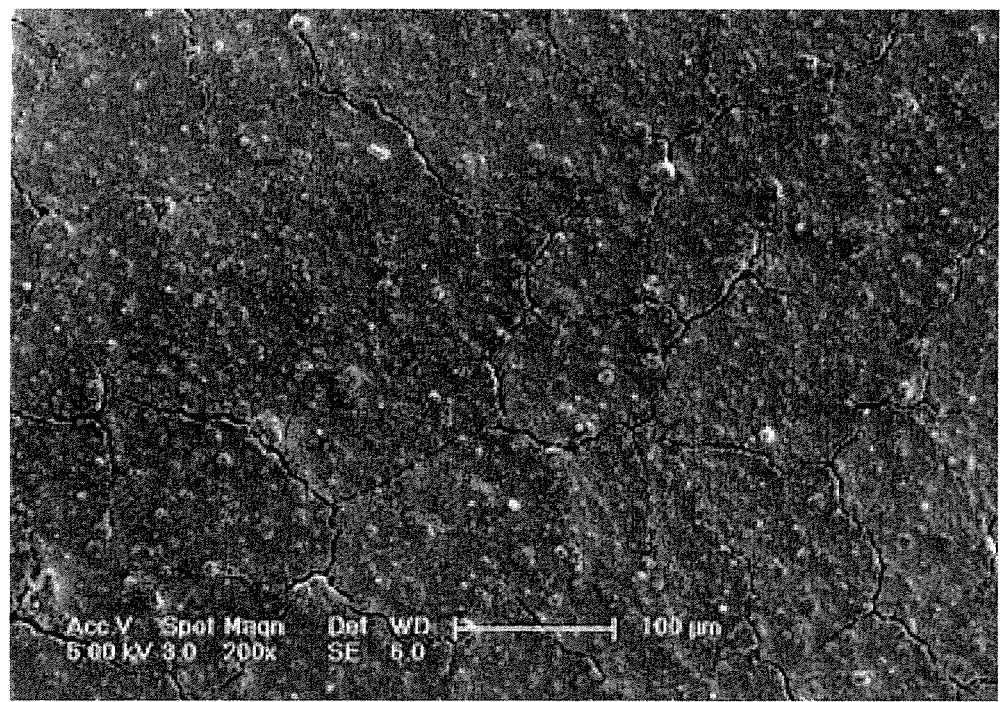
Figure 16:
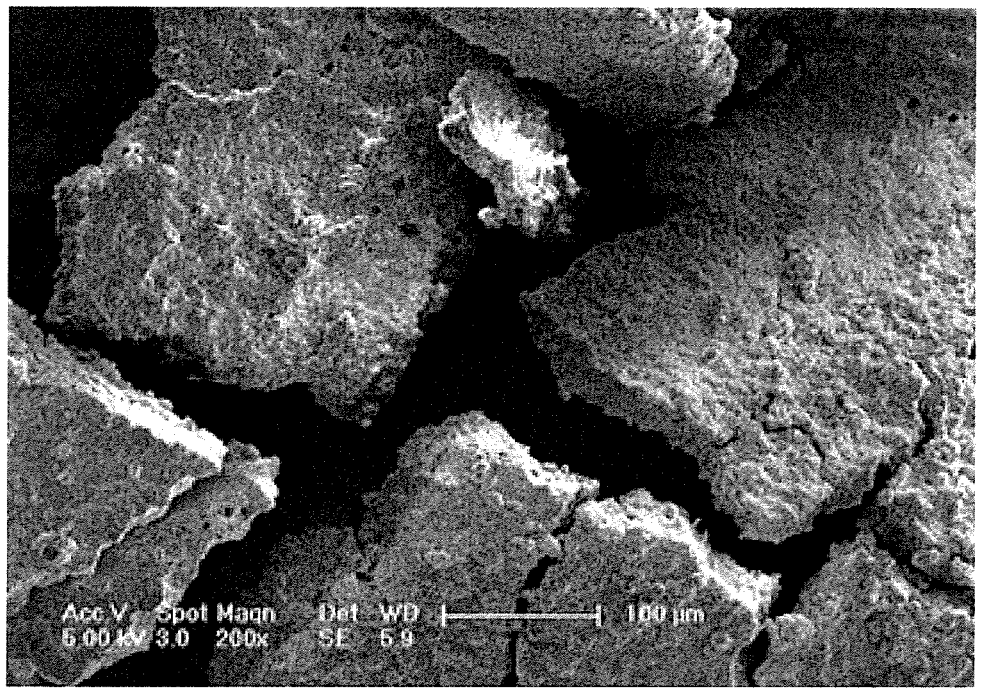
Figure 17:
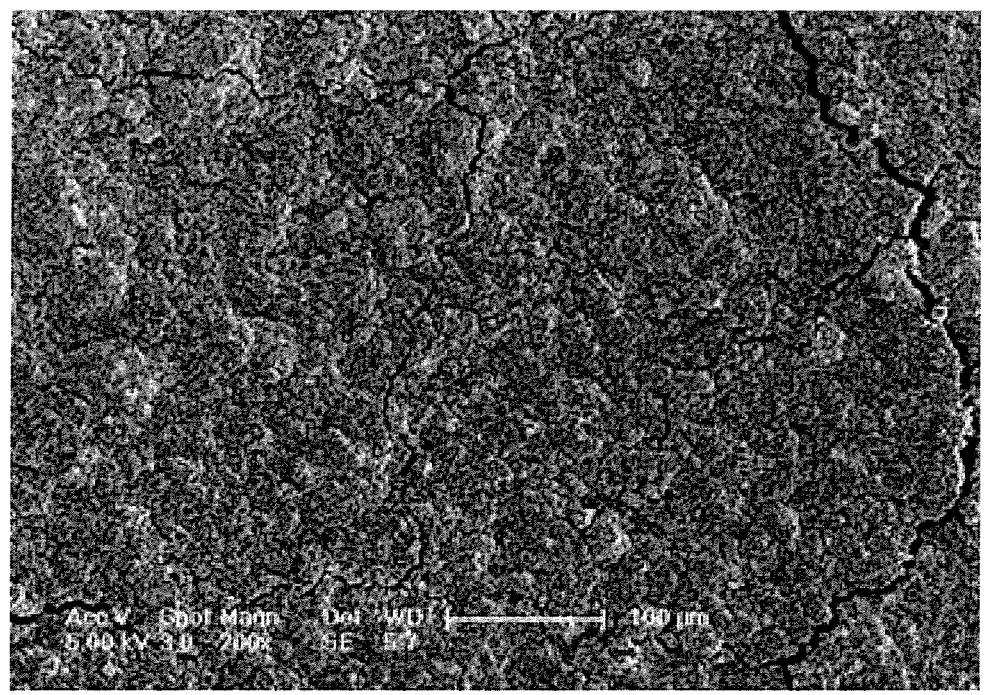

After the batteries manufactured in Examples 1-3 (FIGS. 14 and 15) and the batteries manufactured in Comparative Examples 1-2 (FIGS. 16 and 17) were charged and discharged, surfaces of coin cell electrode plates were analyzed by FE-SEM. As confirmed by FE-SEM, severe cracks were created on the surfaces of the coin cell electrode plates fabricated in Comparative Examples 1-2, which exhibited a sharp reduction in the capacity retention ratio. By contrast, even after the coin cell electrode plate fabricated in Example 1 was charged and discharged, the surface of the coin cell electrode plate was shown to be relatively good, without cracks occurring to the surface.

While this invention has been particularly shown and described with reference to exemplary embodiments thereof, it will be understood by those skilled in the art that the invention is not limited to the disclosed embodiments, but, on the contrary, is intended to cover various changes in form and details included within the spirit and scope of the appended claims and equivalents thereof.

The invention claimed is:

1. A negative electrode active material for a secondary battery comprising:
   a Si-metal alloy comprising Si, the Si being present in the Si-metal alloy in an amount of 66 at % or less and more than 0 at %, and at least a portion of the Si being crystalline Si,
   wherein the Si-metal alloy comprises Si-metal alloy particles having an average diameter ($D_{50}$) in a range of 3 to 10 μm.

2. The negative electrode active material of claim 1, wherein the crystalline Si has a crystal grain size of 30 nm or less and more than 0 nm.

3. The negative electrode active material of claim 1, wherein the Si is present in the Si-metal alloy in an amount in a range of 66 at % to 60 at %.

4. The negative electrode active material of claim 3, wherein the Si is present in the Si-metal alloy in an amount in a range of 65 at % to 62 at %.

5. The negative electrode active material of claim 1, wherein the Si-metal alloy further comprises one or more metals selected from the group consisting of Ca, Sc, Ti, V, Cr, Mn, Fe, Co, Ni, Cu, Zn, Sr, Y, Zr, Nb, Ba, Lu, Hf, Ta, and lanthanoids.

6. The negative electrode active material of claim 1, wherein the Si-metal alloy further comprises a first metal and a second metal differing from the first metal.

7. The negative electrode active material of claim 6, wherein the Si-metal alloy comprises SiTiNi, SiFeAl, SiMnAl, SiFeTi, SiFeMn, or SiAlNi.

8. The negative electrode active material of claim 6, wherein the first metal and the second metal are each independently present in an amount in a range of 10 to 20 at %.

9. The negative electrode active material of claim 1, wherein the crystalline Si has spherically shaped grains.

10. A secondary battery comprising:
    a case; and
    an electrode assembly housed in the case and comprising a negative electrode, a positive electrode, a separator between the negative electrode and the positive electrode, and a nonaqueous electrolyte,
    wherein the negative electrode comprises a negative electrode active material comprising a Si-metal alloy comprising Si, the Si being present in the Si-metal alloy in an amount of 66 at % or less and more than 0 at %, and at least a portion of the Si being crystalline Si,
    wherein the Si-metal alloy comprises Si-metal alloy particles having an average diameter ($D_{50}$) in a range of 3 to 10 μm.

11. The secondary battery of claim 10, wherein the crystalline Si has a crystal grain size of 30 nm or less and more than 0 nm.

12. The secondary battery of claim 10, wherein the Si is present in the Si-metal alloy in an amount in a range of 66 at % to 60 at %.

13. The secondary battery of claim 10, wherein the Si-metal alloy further comprises one or more metals selected from the group consisting of Ca, Sc, Ti, V, Cr, Mn, Fe, Co, Ni, Cu, Zn, Sr, Y, Zr, Nb, Ba, Lu, Hf, Ta, and lanthanoids.

14. The secondary battery of claim 10, wherein the Si-metal alloy further comprises a first metal and a second metal differing from the first metal.

15. The secondary battery of claim 14, wherein the Si-metal alloy comprises SiTiNi, SiFeAl, SiMnAl, SiFeTi, SiFeMn, or SiAlNi.

16. The secondary battery of claim 14, wherein the first metal and the second metal are each independently present in an amount in a range of 10 to 20 at %.

* * * * *